May 11, 1965   A. WASYNCZUK   3,183,387
GENERATOR
Filed June 5, 1962   2 Sheets-Sheet 1

INVENTOR.
ANATOL WASYNCZUK
BY Hofgren, Brady, Wegner, Allen, & Stellman
ATTYS.

May 11, 1965     A. WASYNCZUK     3,183,387
GENERATOR

Filed June 5, 1962     2 Sheets-Sheet 2

United States Patent Office 3,183,387
Patented May 11, 1965

3,183,387
GENERATOR
Anatol Wasynczuk, Chicago, Ill., assignor to Barnes & Reinecke, Inc., a corporation of Delaware
Filed June 5, 1962, Ser. No. 200,133
11 Claims. (Cl. 310—156)

This invention relates to generators and in particular to brushless alternators.

There has long been a demand for an efficient, compact and inexpensive alternator such as for vehicular use and in particular for use in aircraft. The alternators heretofore available have had the serious deficiencies of relatively costly construction, complexity, restrictions on the use thereof, and limitations on the range of input speeds with which they are usable. The present invention comprehends an improved alternator avoiding the above discussed deficiencies of the known alternators in a novel and simple manner.

Thus, a principal feature of the present invention is the provision of a new and improved alternator structure.

Another feature of the invention is the provision of such an alternator structure having improved efficiency and low cost.

A further feature of the invention is the provision of such an alternator structure having an improved flux transfer arrangement.

Still another feature of the invention is the provision of such an alternator structure having an improved rotor pole structure.

Yet another feature of the invention is the provision of such an alternator structure wherein the rotor pole structure is arranged in a new and improved manner for effectively minimizing frictional losses resulting from interaction between the pole structure and the surrounding fluid medium.

Another feature of the invention is the provision of such an alternator structure having an improved arrangement of the excitation coil therein.

A yet further feature of the invention is the provision of such an alternator structure having integrally associated rectifying means and input gear drive means.

Other features and advantages of the invention will be apparent from the following description taken in connection with the accompanying drawing wherein.

Figure 1:
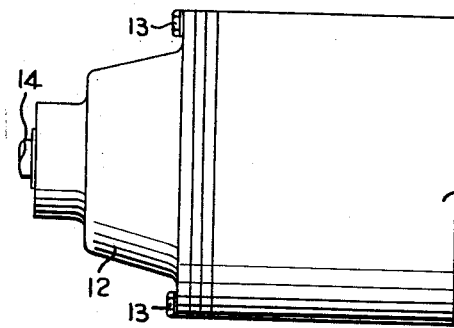
FIG. 1 is a front elevation of a generator embodying the invention.
Figure 2:
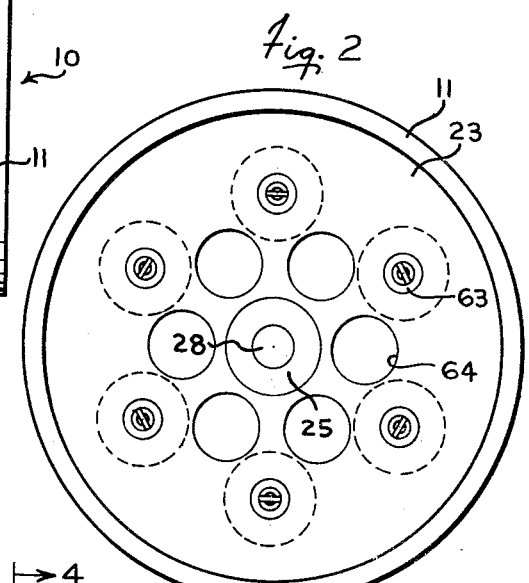
FIG. 2 is a right end elevation thereof.
Figure 3:
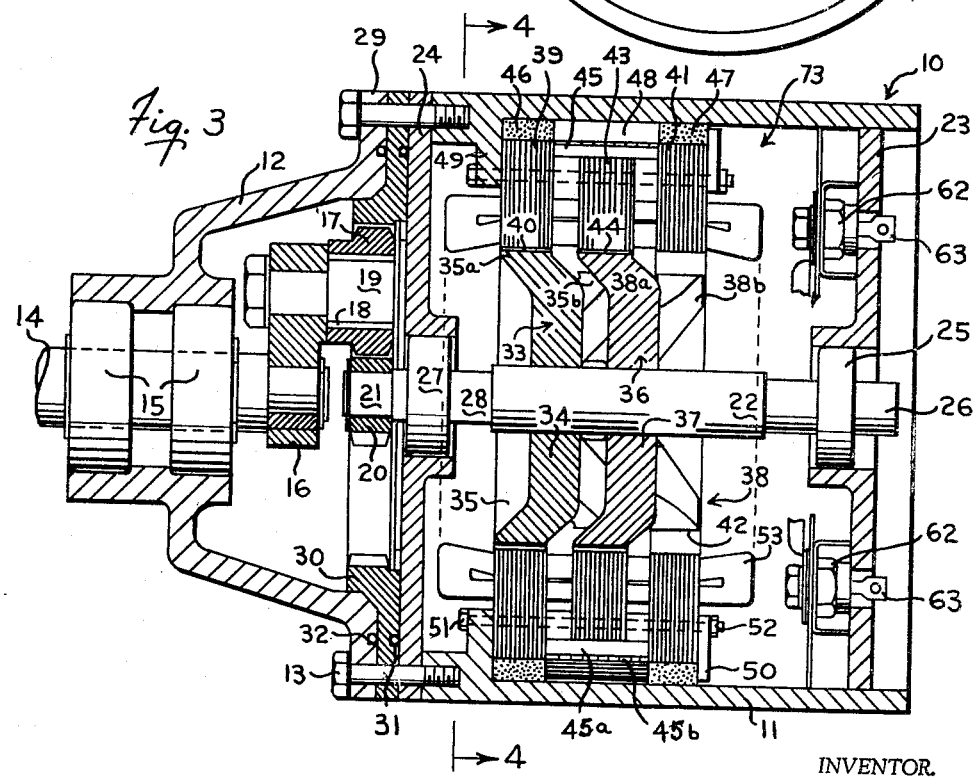
FIG. 3 is an enlarged diametric section thereof.
Figure 5:
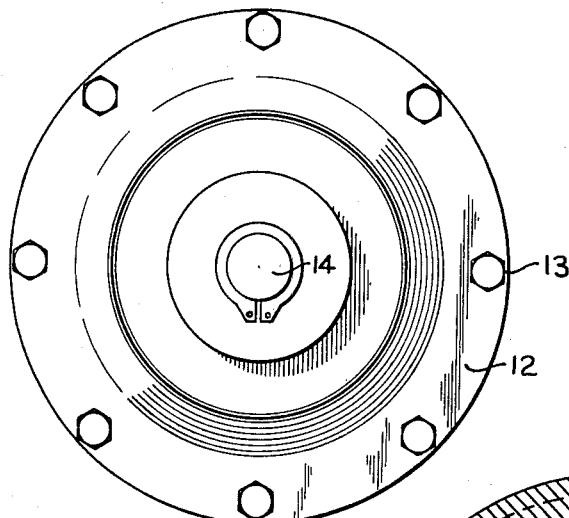
FIG. 5 is a left end elevation thereof.

In the exemplary embodiment of the invention as disclosed in the drawing, a generator generally designated 10 is shown to comprise an annular housing 11 at one end of which is carried a gear housing 12 by suitable means such as bolts 13. The generator is arranged to be driven by a suitable input drive shaft 14 which may have a substantial speed range such as from 1800 r.p.m. to 14,000 r.p.m. As best shown in FIG. 3, the gear housing 12 may be provided with sealed bearings 15 of conventional construction for carrying the outboard end of the shaft 14 coaxially of the housings 11 and 12. A conventional spider 16 is fixed to the distal end of the shaft 14 for driving three spider satellite gears 17 journalled by means of a conventional needle bearing 18 on a stub shaft 19 fixed to the spider 16. The spider gears 17, in turn, drive a gear 20 carried on the left-hand end 21 of the armature shaft 22 of the alternator generally designated 73 disposed within housing portion 11.

As best seen in FIG. 3, the housing 11 is closed at its right-hand end by an end plate 23 and at its left-hand end by an end plate 24. The end plate 23 is provided with an axial sealed bearing 25 journalling the right-hand end 26 of armature shaft 22 and the left end plate 24 is provided with an axial sealed bearing 27 journalling an inner end portion 28 of the armature shaft 22 adjacent the left-hand distal end 21 thereof. Between end plate 24 and an outturned annular flange portion 29 of gear housing 12 is fixed a stationary internal gear 30 in meshing engagement with spider gears 17. The stationary gear is sealed to the end plate 24 by a suitable O-ring 31 and to the gear housing portion 29 by a suitable O-ring 32. It should be understood that other suitable gear drives may be employed for driving the armature shaft 22 from the input shaft 14 and that the illustrated gear train is exemplary only.

Figure 4:
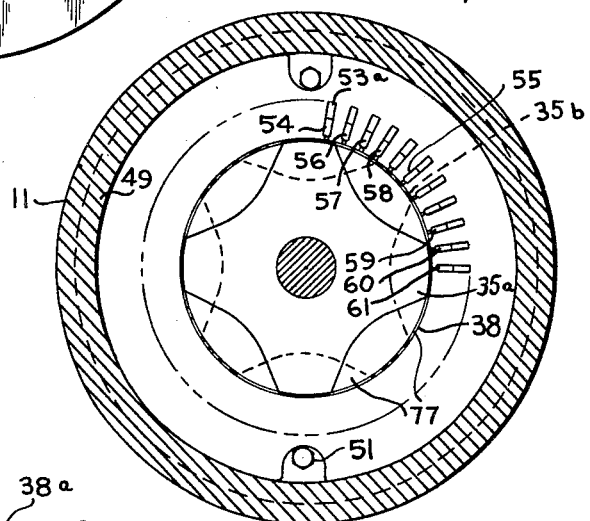
FIG. 4 is a transaxial section taken substantially along the line 4—4 of FIG. 3.
Figure 6:
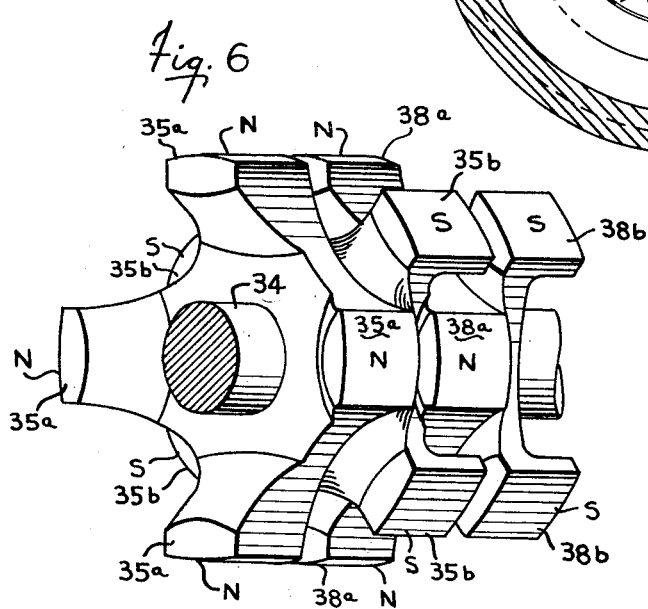
FIG. 6 is an enlarged isometric view of the rotor means thereof.

As indicated above, alternator 73 is disposed within the housing portion 11. In the illustrated embodiment, the alternator 73 includes a first rotor 33 having an annular mid-portion 34 fixed to armature shaft 22 and including a plurality of radially directed, 90° circumferentially spaced north poles 35a, and a plurality of radially directed, 90° circumferentially spaced south pole 35b offset 45° from poles 35a. A second substantially identical rotor 36 is provided with a mid-portion 37 and a plurality of radially directed, circumferentially spaced north poles 38a and south poles 38b. As shown in FIG. 6, the north poles 35a extend angularly to the left from the mid-portion 34 and the south poles 35b extend angularly to the right from the mid-portion 34. As best seen in FIG. 4, an antimagnetic filler 77 may be disposed between the respective poles to define with the poles a substantially continuous cylindrical perimeter 38 effectively preventing losses due to the pole structures moving through the surrounding body of fluid which may be air or oil, as desired.

As indicated briefly above, rotor 36 is substantially identical to rotor 33 and, thus, north poles 38a extend angularly from the mid-portion 37 to the left as seen in FIG. 6, and south poles 38b extend angularly from the mid-portion 37 to the right. A filler 77 may be similarly disposed between the poles 38b to preclude losses from the movement of the poles through the surrounding fluid medium. The fillers 77 have been omitted from FIGS. 3 and 6 to facilitate the showing of the pole structure.

Referring now again to FIG. 3, alternator 73 further includes a first annular axially laminated stator 39 aligned with poles 35a and extending circumjacent the poles 35a to define an air gap 40 therebetween. A similar axially laminated stator 41 is disposed circumjacent poles 38b to define an air gap 42 therebetween. A third annular axially laminated stator 43 is disposed intermediate the stators 39 and 41 in alignment with poles 35b and 38a to define an air gap 44 therebetween. The outer diameter of stator 43 is substantially smaller than the outer diameter of stators 39 and 41 and an annular excitation coil 45 is disposed radially outwardly of stator 43 to extend axially between the stators 39 and 41. Radially outwardly of stator 39 is disposed an annular transfer ring 46 extending between the stator 39 and the housing 11. A similar annular transfer ring 47 is disposed radially outwardly of stator 41 extending radially outwardly therefrom to the housing 11. An annular, axially laminated axial transfer ring 48 is disposed radially outwardly of excitation coil 45 and extends substantially between transfer rings 46 and 47. Transfer rings 46 and 47 are preferably formed of a material conducting flux equally well in each of the radial, axial, and circumferential directions so that a highly efficient flux transfer is obtained therein between the stators and the axial transfer ring 48 notwithstanding the fact that the flux must turn in each of the three directions in passing therebetween. More specifically, the transfer rings may be formed of powdered or sintered iron. While the three transfer rings 46, 47 and 48 may, obviously, be formed of a single integral ring formed of such material, in the interests of economy, the axial ring 48 is formed of axially laminated material.

The fixed portions of the alternator 73, including the stators, transfer rings, and excitation winding are fixedly secured to the housing 11 by means of an inturned flange 49 adjacent end plate 24, a retaining ring 50, and a plurality of long bolts 51 extending through the stators, flange 49 and ring 50, and a nut 52 on the distal end of the bolt 51. The stator windings 53 extend axially through the stators and in the illustrated embodiment are wound three phase, with each phase comprising four parallel windings, the three phases being connected in a star connection. Illustratively, the stator windings may be arranged so that one winding such as winding 53a may go into the plane of the paper as shown in FIG. 4 in the upper portion of one slot 54 and then come out of the plane of the paper in a slot 55 displaced approximately 45°, or 180 electrical degrees, from slot 54. Illustratively, slots 56, 57 and 58 carry the other windings of the phase belts in a manner well known to those skilled in the art.

In the operation of the alternator 73, the flux generated by the excitation coil 45 passes from the rotor poles 35a across the air gap 40 through the stator 39 and then turns through the left transfer ring 46 to pass axially through the transfer ring 48 to the right transfer ring 47 wherein it turns again to pass through the stator 41 and across air gap 42 to the south poles 38b of rotor 36. In passing through the axial transfer ring 48, the flux travels at approximately a 45° angle to a line parallel to the axis of the shaft 22 as the south poles 38b are displaced approximately 45° from the north poles 35a. Thus, the flux sweeps across one side of the winding at a time so that the voltages generated thereby at each end of the generator are additive. The flux passes from the poles 38b through the mid-portion 37 of the rotor 36 to the poles 38a and across air gap 44 through stator 43, through which the flux turns and from which it returns across air gap 44 to poles 35b and mid-portion 34 of rotor 33 to return to poles 35a, thereby completing the flux path.

In the illustrated embodiment, end plates 23 and 24 are preferably formed of antimagnetic material such as brass or aluminum and the armature shaft is preferably formed of an antimagnetic material such as stainless steel. The rotors are preferably formed of conventional ferrous material of high permeability and the stators and transfer ring 48 are preferably formed of high permeability ferrous laminations.

The output of alternator 73 may be used directly as an alternating current output. Illustratively, the generator 10 may be arranged to provide an output of 380 volts alternating current at a frequency of from 4,000 to 9,000 cycles per second. Alternatively, generator 10 may be arranged to provide a direct current output and to this end a plurality of rectifiers 62, which may comprise conventional selenium rectifiers, are secured to the end plate 23, connections to the rectifiers being provided by means of suitable terminals 63 extending through the end plate. Illustratively, the rectifiers may be arranged to provide a 28-volt direct current output. To maintain the output voltage substantially constant, the excitation coil 45 is preferably a compound coil having a first portion 45a adjustably energized in accordance with the speed of the input shaft 14, and a second portion 45b arranged to be adjustably energized in accordance with the load requirements.

In the illustrated embodiment, the end plate 23 is provided with a plurality of vent openings 64 for ventilation of the alternator. Where the generator is arranged to be oil-filled, these openings would, of course, be omitted.

In the illustrated embodiment, the rotors are arranged with four pairs of poles each. As will be obvious to one skilled in the art, any number of pole pairs may be provided with suitable corresponding arrangement of the stator windings. Further, as will be obvious to one skilled in the art, any number of rotor-stator sections may be employed, the illustrated embodiment being limited to two rotors for simplification of the disclosure.

While I have shown and described one embodiment of my invention, it is to be understood that it is capable of many modifications. Changes, therefore, in the construction and arrangement may be made without departing from the spirit and scope of the invention as defined in the appended claims.

I claim:
1. An alternator structure, comprising: a rotor shaft defining an axis of rotation; rotor means on said shaft defining a plurality of radially directed, circumferentially spaced south poles and a plurality of radially directed, circumferentially spaced north poles, at least one north pole being disposed to move in an annular path axially disaligned with said south poles and at least one south pole being disposed to move in an annular path axially disaligned with said north poles; first annular stator means coaxially circumjacent said south poles; second annular stator means coaxially circumjacent said north poles; a first transfer ring concentrically around said first stator means; a second transfer ring concentrically around said second stator means, said transfer rings being arranged to transfer magnetic flux therethrough substantially uniformly in each of the radial, axial and circumferential directions; and permeable means extending axially between said transfer rings for transferring magnetic flux therebetween.

2. The alternator structure of claim 1 wherein said transfer rings are formed of substantially uniformly distributed particulate permeable material.

3. The alternator structure of claim 1 wherein said transfer rings are formed of substantially uniformly distributed particulate permeable material, said stator means are axially laminated and said permeable means is radially laminated.

4. An alternator structure, comprising: a rotor shaft defining an axis of rotation; rotor means on said shaft defining a plurality of radially projecting, circumferentially spaced south poles and a plurality of radially projecting, circumferentially spaced north poles, said north poles being axially and angularly disaligned relative to said south poles; antimagnetic means carried by said rotor means and extending circumferentially between said poles, first annular stator means coaxially circumjacent said south poles; second annular stator means coaxially circumjacent said north poles; and permeable means extending between said stator means for transferring magnetic flux therebetween.

5. The alternator structure of claim 4 wherein said north poles and said antimagnetic means therebetween define a substantially continuous cylindrical perimeter, and said south poles and said antimagnetic material means therebetween define a substantially continuous cylindrical perimeter.

6. An alternator structure, comprising: a rotor shaft defining an axis of rotation; rotor means on said shaft defining a plurality of radially projecting, circumferentially spaced south poles and a plurality of radially projecting circumferentially spaced north poles, said north poles being axially and angularly disaligned relative to said south poles; antimagnetic means carried by said rotor means and extending circumferentially between said poles, said north poles and said antimagnetic means therebetween defining a substantially continuous cylindrical perimeter, and said south poles and said antimagnetic material means therebetween defining a substantially continuous cylindrical perimeter; first annular stator means coaxially circumjacent said south poles; second annular stator means coaxially circumjacent said north poles; a first transfer ring concentrically around said first stator means; a second transfer ring concentrically around said second stator means, said transfer rings being arranged to transfer magnetic flux therethrough substantially uniformly in each of the radial, axial and circumferential directions; and permeable means extending axially between said transfer rings for transferring magnetic flux therebetween.

7. An alternator structure, comprising: a rotor shaft defining an axis of rotation; a first rotor on said shaft defining a first plurality of radially directed, circumferentially spaced south poles displaced axially in one direction from a transaxial central plane of the rotor, and a first plurality of radially directed, circumferentially spaced north poles displaced axially in the opposite direction from the transaxial central plane of the rotor, the north poles being angularly displaced relative to said south poles; a second rotor on said shaft having a configuration substantially identical to said first rotor and defining a second plurality of radially directed, circumferentially spaced south poles displaced axially in said one direction from a transaxial central plane of the second rotor, and a second plurality of radially directed, circumferentially spaced north poles displaced axially in said opposite direction from said transaxial central plane of the second rotor, the north poles of said second plurality being angularly disaligned relative to said south poles of the second plurality; first annular stator means coaxially circumjacent said first plurality of north poles; second annular stator means coaxially circumjacent said second plurality of south poles; third annular stator means intermediate said first and second stator means coaxially circumjacent said first plurality of south poles and said second plurality of north poles; and permeable means extending between said first and second stator means for transferring magnetic flux therebetween.

8. The alternator structure of claim 7 wherein each said rotor includes an annular mid-portion and the poles extend therefrom angularly to the transaxial central plane thereof.

9. The alternator structure of claim 7 wherein an excitation coil for magnetizing said poles is disposed circumjacent said third stator means and inwardly of said permeable means to provide an antimagnetic barrier between said third stator means and said permeable means.

10. An alternator rotor structure, comprising: a rotor having an annular mid-portion defining a transaxial central plane, a first plurality of outwardly directed, circumferentially spaced magnetic poles extending angularly from said mid-portion in one direction from said transaxial plane to define a first annular arrangement of poles, and a second plurality of outwardly directed, circumferentially spaced magnetic poles extending angularly from said mid-portion in the opposite direction from said transaxial plane to define a second annular arrangement of poles spaced axially from said first annular arrangement, the poles of said second plurality being angularly displaced relative to the poles of said first plurality.

11. The alternator structure of claim 7 including means for providing a brushless excitation of the alternator comprising an excitation coil disposed circumjacent said third stator means.

References Cited in the file of this patent
UNITED STATES PATENTS

| | | |
|---|---|---|
| 1,327,504 | Wagner | Jan. 6, 1920 |
| 2,795,715 | Gilchrist | June 11, 1957 |
| 2,934,662 | Robinson | Apr. 26, 1960 |